United States Patent Office 3,711,424
Patented Jan. 16, 1973

3,711,424
ORGANOLITHIUM POLYMERIZATION INITIATORS
William J. Trepka and Richard J. Sonnenfeld, Bartlesville, Okla., assignors to Phillips Petroleum Company, Bartlesville, Okla.
No Drawing. Continuation of abandoned application Ser. No. 772,865, Nov. 1, 1968. This application Feb. 24, 1971, Ser. No. 118,575
Int. Cl. C08f 7/02, 3/16
U.S. Cl. 252—431 R                                        8 Claims

ABSTRACT OF THE DISCLOSURE

Improved 4-halophenyllithium polymerization initiators are prepared by milling 4-halophenyllithium as a highly dispersed form in a hydrocarbon dispersing medium.

---

This application is a continuation of application Ser. No. 772,865 filed Nov. 1, 1968, now abandoned.

This invention relates to an improved polymerization initiator and to a process for preparing the same. In another aspect, it relates to an improved process for polymerizing polymerizable monomers.

In recent years, certain hydrocarbon insoluble or sparingly soluble organolithium polymerization initiators have been demonstrated as effective stereospecific initiator systems in the polymerization of butadiene or isoprene to give polymers having a desired high cis-1,4 addition and often possessing outstanding physical properties.

Exemplary of these initiators are those disclosed in U.S. Pat. 3,215,679 issued to Trepka, Nov. 2, 1965, and U.S. Pat 3,393,189 issued to Trepka et al., July 16, 1968.

When initiators, as disclosed in these patents, are employed for the polymerization of isoprene or butadiene, both the resultant structure and inherent viscosity of the polymer are much less sensitive to changes in initiator level than when other organolithium compounds are used.

Other advantages such as higher cis-content and short induction periods are likewise attendant to their use. Exemplary of the aforementioned initiators and generally representing the recently discovered organolithium compounds which are sparingly soluble in hydrocarbon media and precipitate therefrom when prepared in the presence of hydrocarbon diluents, and which have been employed to achieve the satisfactory consequences thus outlined, are certain and specific isomers of halophenyllithium.

It is surprising, as outlined in the aforementioned patents, that only certain isomers of the halophenyllithiums give these exceptional results, i.e., the 3 - halophenyllithiums, while the 4-halophenyllithiums, although well-known initiators, are generally more erratic, higher initiator levels are generally required for polymerization, induction periods are longer, conversions are frequently lower, inherent viscosity is generally lower, and cis-contents are often lower than when the 3-halophenyllithiums are employed.

Due to the exceptional results obtainable with this select group of stereospecific polymerization initiators, great activity has continued in this field.

Contrary to the teachings of the art, an exceptional and surprising discovery of a new process has been made wherein the exceptional advantage that was believed concomitant only with the employment of 3 - halophenyllithiums has been realized through employment of the 4-halophenyllithiums which are currently substantially less expensive commercially.

Thus, it is an object of this invention to provide an improved process for the polymerization of butadiene or isoprene or mixtures thereof and their copolymerization with other polymerizable monomers. It is another object of this invention to produce rubbery polymeric products having improved properties and having a high percentage of cis-1,4 addition.

It is another object of this invention to provide a method for controlling the physical properties, particularly the inherent viscosity of the polymers of butadiene or isoprene.

It is another object to provide an improved polymerization process utilizing 4-halophenyllithium.

It is still another object to provide an improved 4-halophenyllithium polymerization initiator of 4-halophenyllithium. Other advantages and objects of this invention will become apparent to those skilled in the art upon consideration of the accompanying disclosure and the appended claims.

In one embodiment, this invention is a process for preparing an improved polymerization initiator from 4-halophenyllithium by milling the compound under an inert atmosphere. It is truly surprising that the activity of this isomer is drastically changed by milling because under identical circumstances, milling of the 3-halophenyllithiums failed to give any substantial change. Furthermore, this effect is particularly outstanding because both the 3 and 4-isomers of the halophenyllithiums are prepared under the same circumstances. In view of these facts, the sole reasons for the increased activity of only the 4-halophenyllithium isomers cannot be stated exactly.

The increase in activity of the 4-halophenyllithium is achieved by imparting an abrasive force upon the 4-halophenyllithum compounds such as by applying an abrasive action through various attrition devices.

Various mills and the like, wherein stainless steel balls, the walls of the vessel, blades or vanes of a stirrer, the solid particles of the compound itself, or the like, can provide the abrasive force against the 4-halophenyllithium compound. A ball or pebble mill are exemplary devices.

A preferred device is an ultrasonic bath such as a Model G–140 made by the National Ultrasonic Corporation which imparts a work force of ultrasonic energy upon the halophenyllithiums.

It is to be understood that within the perimeter of this disclosure and claims that the term "milling" includes all the methods and devices as enumerated above as well as those known generally throughout the art.

The milling is performed under an inert atmosphere such as argon, helium, nitrogen, and the like, and can take place in the presence or absence of an inert diluent such as aliphatic, cycloaliphatic, or aromatic hydrocarbons.

In one embodiment, the milling process is carried out during the preparation of the 4-halophenyllithium initiator.

In the milling process, the time employed will depend upon the particular method or milling device chosen, but will at least be sufficient to cause the desired increase in initiator activity. For ball milling or ultrasonic milling, the time employed will range from about one minute to one-hundred hours, preferably about one to about twenty-four hours. The optimum times period depends, in general, on the efficiency of the equipment used and the particular 4-halophenyllithium compound employed. The frequency and force of collision as in ball milling and the wave frequency, intensity, and absorbing capacity of the ultrasonic milled compound will vary the time employed.

The ultrasonic vibration frequency generally will be at least 20 to 1000 kc./s. (kilocycles per second).

The intensity, i.e. average rate of energy flow per unit area of the ultrasonic bath, varies from about $10^{-4}$ to 20 w./cm.$^2$ (watts per square centimeter) and preferably from about 0.1 to 10 w./cm.$^2$.

The time period most suitable for any given milling equipment can easily be determined by routine experimentation.

As used herein, the term "ultrasonic" means vibratory waves of a frequency above the limit of the human ear.

The temperature employed during the milling process can be varied over a wide range and is conducted below the melting point of the compound to be milled and is generally in the range of about —50 to 200° C., preferably from about 0 to 100° C.

The 4-halophenyllithium initiators can be prepared by any method desired. One suitable procedure is to react a 1,4-dihalobenzene with a sulfficient amount of lithium metal or an alkyllithium compound such as sec or n-butyllithium so that an amount up to and including 1 mole of lithium is is provided for each mole of 1,4-dihalobenzene compound. Further, the initiator is prepared in the absence of deleterious substances such as water, carbon dioxide and the like. Those substances can be excluded by employing only purified materials and by preparing the initiator under a blanket of inert gas such as argon, helium, nitrogen, and the like.

The organolithium polymerization initiators can be prepared in a hydrocarbon or polar medium. Hydrocarbons of the same types generally used for the polymerization process are applicable such as n-pentane, cyclohexane, n-octane, toluene and the like, as well as materials which boil at a temperature above 200° C. such as mineral oil. When a polar diluent is used for initiator preparation, it is desirable that it be replaced with a relatively high boiling hydrocarbon diluent. The relatively high boiling or heavy hydrocarbon dispersing medium is advantageous in that it serves to coat the organilithium particles and keeps them in a highly dispersed form as well as rendering them non-pyrophoric and consequently, easy to handle.

The initiator precipitates upon formation and as hereinabefore stated, it is within the scope of this invention to carry out the milling process during the formation of said insoluble or slightly soluble organolithium initiator.

The 4-halophenyllithium compounds represented by this invention include 4-bromophenyllithium, 4-fluorophenyllithium, and 4-chlorophenyllithium. Generally, these compounds can, according to this invention, be employed for the polymerization of the same monomers that can be polymerized with any organolithium initiator. Generally, such polymerizable monomers as the conjugated dienes, vinyl-substituted aromatic compounds, polar monomers, or mixtures thereof, can be homopolymerized or copolymerized with another monomer selected from these groups to form random or block copolymers.

Exemplary of some of these aforementioned monomers are conjugated dienes containing 4 to 12 carbon atoms per molecule such as 1,3-butadiene, isoprene, 2,3-dimethyl-1,3-butadiene, 2,3-diethyl-1,3-butadiene, 1,3-pentadiene, 2-phenyl-1,3-butadiene, 1,3-octadiene, 1,3-dodecadiene, and the like.

Vinyl-substituted aromatic compounds employable include styrene, alpha-methyl styrene, 1-vinylnaphthalene, 1 - alpha-methylvinylnaphthalene, 2-alpha-methylvinylnaphthalene, and alkyl, cycloalkyl, aryl, alkylaryl, and arylalkyl derivatives thereof in which the total carbon atoms in the combined hydrocarbon substituents is generally not greater than 12. Exemplary of some of these compounds are 3-methylstyrene; 3,5 - diethylstyrene; 2-ethyl-4-benzylstyrene; 6 - cyclohexyl-1-vinylnaphthalene; 2,4,6,8-tetramethyl-1-alpha-methylvinylnaphthalene; and the like.

Among the polar compounds applicable are vinylpyridines, vinylquinolines and vinylisoquinolines in which the vinyl groups are positioned on a ring carbon other than a beta carbon with respect to the nitrogen. These pyridine, quinoline, isoquinoline derivatives can carry substituents such as alkyl, cycloalkyl, aryl, and mixtures thereof such as alkylaryl, arylalkyl, alkylcycloalkyl and the like, as well as alkoxy, aryloxy, and dialkylamino groups. The total carbon atoms in the comprised substituents is generally not greater than 12. Exemplary of these heterocyclic-nitrogen monomers are 2-vinylpyridine;
4-vinylpyridine;
5-n-octyl-2-vinylpyridine;
4-phenyl-2-vinylpyridine;
4-phenoxy-2-vinylpyridine;
6-methoxy-2-vinylpyridine;
4-vinylquinoline;
3-methyl-4-vinylquinoline;
3-methyl-4-methoxy-2-vinylquinoline;
3-vinylisoquinoline;
4-tert-dodecyl-1-vinylisoquinoline;
3-dimethylamino-3-vinylisoquinoline;
4-benzyl-3-vinylisoquinoline;

and the like.

Other polar monomers include acrylic and alkacrylic acid esters, nitriles, N,N-di-substituted amides, such as methyl acrylate, ethyl acrylate, butyl acrylate, methyl methacrylate, ethyl methacrylate, propyl methacrylate, butyl methacrylate, methyl methacrylate, and ethyl methacrylate, isopropyl ethacrylate, acrylonitrile, methacrylonitrile, N,N-dimethylacrylamide, and N,N-diethylmethacrylamide. Vinylfuran and N-vinylcarbazole can also be used. Butadiene and isoprene are of particular interest in view of the 3-halophenyllithium initiators and are especially employable with the 4-halophenyllithium initiators of this invention.

The quantity of the 4-halophenyllithium initiator employed during the polymerization can vary appreciably depending upon the initiator selected as well as the polymerization conditions and that which is sufficient to initiate the polymerization process is employed. Generally, the quantity employed is from about 0.1 to 100 gram millimoles of 4-halophenyllithium compound per 100 grams of monomer with the preferred amount of from 0.2 to 60 millimoles. The 4-halophenyllithium initiators prepared according to this invention give exceptional results when employed as initiators for the polymerization of isoprene or butadiene as hereinbefore stated. The initiators of this invention can also be employed as co-initiators with other well-known stereospecific initiators such as butyllithium and related lithium alkyls.

The rubbery polymers such as from isoprene or butadiene can, in accordance with this invention, be compounded by any of the known methods such as have been used in the past for compounding rubbers. Vulcanizing agents, vulcanization accelerators, accelerator activators, reinforcing agents, antioxidants, softeners, plasticizers, extenders, fillers and other compounding ingredients such as have been normally employed in rubbers can be likewise used in the polymers of this invention. Rubbery diene polymers have utility and application where either natural or synthetic rubbers are used. The rubbery polymers produced by the process of this invention can be blended by any suitable method with other synthetic rubbers and/or natural rubber. For example, they can be used in the manufacture of automobile tires, gaskets, and other rubbery articles.

Polymers prepared which contain a major amount of the vinyl group-containing monomers are generally thermoplastics and can thus be molded or extruded to form tubing, containers, toys, machine parts and the like. These polymers can contain plasticizers, pigments, stabilizers, and antioxidants commonly employed in such applications.

Illustrative of the invention, and not to be interpreted as a limitation upon the scope or the materials herein employed, the following exampes are exemplarily presented.

EXAMPLE I

A 3-bromophenyllithium initiator was prepared according to the following recipe:

| | |
|---|---|
| Cyclohexane _____ ml__ | 100 |
| 1,3-dibromobenzene _____ mmoles__ | 20 |
| n-Butyllithium _____ do____ | 20 |
| Temperature, °C. _____ | 50 |

In these preparations the diluent (cyclohexane) was charged to the bottle-reactor first, followed by a nitrogen purge. The 1,3-dibromobenzene was added next followed by n-butyllithium. The reaction was continued until the n-butyllithium was consumed and essentially all of the 1,3-dibromobenzene was converted to 3-bromophenyllithium. At the end of the reaction period, of about 2 hours, fifteen stainless steel balls of 3/8 inch diameter were placed in the reaction mixture which was to be ball milled and the bottle reactor then placed on a paint mill for five hours during which time the reaction mixture was subjected to the abrasive action of the tumbling steel balls. This ball milling was conducted at a temperature of about 25° C. Both ball milled and non-ball milled reaction mixtures were employed in the polymerization of isoprene according to the following recipe and the results are recorded in Table I.

| | |
|---|---|
| Cyclohexane _____ parts by wt__ | 500 |
| Isoprene _____ do____ | 100 |
| Initiator _____ do____ | Variable |
| Time _____ hours__ | Variable |
| Temperature, °C _____ | 70 |

Run 1 of Table I represents the initiator that was not ball milled, and Run 2 represents the initiator that was ball milled. Diluent (cyclohexane) was charged to the reactor first, followed by a nitrogen purge. Isoprene was added next, followed by the initiator. At the end of the polymerization runs each mixture was terminated with a 10 weight percent solution of the antioxidant 2,2'-methylene-bis(4-methyl-6-tert-butylphenol) in isopropyl alcohol with the amount added being sufficient to provide one part by weight of the antioxidant per 100 parts by weight of monomer. Each terminated mixture was then coagulated in isopropyl alcohol and the polymer separated and dried under vacuum at 60° C. The results obtained in these runs are shown below in Table I.

TABLE I

| Run number | Initiator, mhm.* | Time | Conv., percent | Inherent viscosity |
|---|---|---|---|---|
| 1 a_____ | 7.5 | 3 | 67 | 2.42 |
| 2 b_____ | 7.5 | 3 | 70 | 2.21 | a Initiator prepared in cyclohexane, not ball-milled.
b Initiator prepared in cyclohexane, ball-milled.
c Determined according to U.S. 3,278,508, column 20, notes a and b.
*Mhm.=gram millimoles per 100 grams of monomer.

The above results demonstrate that ball-milling of 3-bromophenyllithium had only a very slight effect on the inherent viscosity and on the conversion of the polymers prepared in the presence of such an initiator.

EXAMPLE II 4-bromophenyllithium was prepared using the recipe, and charging procedures presented in Example I, except 1,4-dibromobenzene was substituted for 1,3-dibromobenzene. The reaction was continued until the n-butyllithium was consumed and essentially all of the 1,4-dibromobenzene was converted to 4-bromophenyllithium. Samples of the reaction mixture were analyzed for alkalinity by titration with .1 N HCl. Gas chromatography analysis showed that less than 2% of the alkalinity was due to unreacted n-butyllithium. The reaction products were ball milled for 4 hours and employed, for comparison purpose, along with non-ball milled reaction products in the polymerization of isoprene. The recipe, charging, termination and polymer isolation procedures of Example I were followed except that all of the polymerizations were conducted in 1000 phm., cyclohexane and reaction time was 20 hours, and the results are reported in Table II as Runs 1–15.

TABLE II

| Run No. | Initiator Type | Initiator Mhm. | Conv., percent | Inherent viscosity a | Unsaturation Cis-1,4, percent | Unsaturation 3,4 percent |
|---|---|---|---|---|---|---|
| 1_____ | L b | 3.0 | Trace | | | |
| 2_____ | L' c | 2.0 | 100 | 4.92 | 82 | 5.2 |
| 3_____ | L' c | 1.3 | 100 | 7.18 | 86 | 5.2 |
| 4_____ | L' c | 1.2 | 100 | 6.53 | 87 | 5.7 |
| 5_____ | M c | 5.0 | 0 | | | |
| 6_____ | M c | 3.0 | 0 | | | |
| 7_____ | M' f | 2.0 | 100 | 4.77 | 81 | 5.9 |
| 8_____ | M' f | 1.1 | 100 | 7.58 | 85 | 5.3 |
| 9_____ | M' f | 1.0 | 100 | 6.58 | 87 | 5.2 |
| 10_____ | N d | 5.0 | 0 | | | |
| 11_____ | N d | 3.0 | 0 | | | |
| 12_____ | N' g | 1.5 | 100 | 4.09 | 76 | 6.1 |
| 13_____ | N' g | 1.1 | 100 | 5.78 | 80 | 5.8 |
| 14_____ | N' g | 1.0 | 100 | 5.47 | 76 | 5.9 |
| 15_____ | N' g | 0.9 | 100 | 6.35 | 80 | 5.8 | a All polymers were gel-free.
b Initiator made in toluene, not ball milled.
c Initiator made in cyclohexane, not ball milled.
d Initiator made in pentane, not ball milled.
e Initiator made in toluene, ball milled.
f Initiator made in cyclohexane, ball milled.
g Initiator made in pentane, ball milled.

The foregoing example and data effectively demonstrate the surprising increase in initiator activity achieved by ball milling of the 4-halophenyllithium compound. It also shows that the resultant polymer properties, i.e., cis-content and inherent viscosity of the polymer are not particularly sensitive to changes in the initiator level when employing the ball milled 4-halophenyllithium compound initiators.

EXAMPLE III

Two initiator mixtures, X and Y, were prepared employing the same recipe which is shown below.

Initiator recipe

| | |
|---|---|
| 1,4-dibromobenzene _____ g__ | 1 4.72 |
| Toluene _____ ml__ | 110 |
| n-Butyllithium _____ mmoles__ | 22 |
| Time, hours _____ | 20 |
| Temperature °C _____ | 50 |

1 20 mmoles.

In these preparations, toluene was charged to the bottle-reactor first, followed by a nitrogen purge. 1,4-dibromobenzene was added next followed by n-butyllithium. At the end of the reaction period, mixture X was charged with 15 stainless steel balls of 3/8 inch diameter. This bottle-reactor containing mixture X was then placed on a paint mill for four hours during which time mixture X was subjected to the abrasive action of the tumbling steel balls. This ball milling was done at a temperature of about 25° C. Samples of mixtures X and Y were analyzed for alkalinity by titration with 0.1 N HCl. Gas chromatographic analysis of a simple of mixture X showed that less than 2 percent of the alkalinity was due to unreacted n-butyllithium.

Reaction mixtures X and Y were employed in the polymerization of isoprene in the recipe shown below. To further demonstrate the effect of bell milling on initiator activity, the remainder of mixture Y was treated as follows: 80 ml. of toluene was removed from the mixture Y; the residue was ball milled as in the case of mixture X above; additional toluene was added after this step to bring the total volume to 100 ml.; a sample of this mixture denoted Z was analyzed for alkalinity as above; and a sample was analyzed also for unreacted n-butyllithium as above which showed 2 percent of the alkalinity was due to unreacted n-butyllithium. Mixture Z was then also employed for isoprene polymerization in the recipe shown.

Polymerization recipe

| | | |
|---|---|---|
| Isoprene | parts | 100 |
| Cyclohexane | do | 1000 |
| Initiator | do | Variable |
| Time, hours | | 70 |
| Temperature °C | | 70 |

In these runs, cyclohexane was charged to the reactor first, followed by a nitrogen purge. Isoprene was added next, followed by the initiator. At the end of the polymerization runs each mixture was terminated with a 10 weight percent solution of the antioxidant 2,2'-methylene-bis(4-methyl-6-tert-butyl-phenol) in isopropyl alcohol with the amount added being sufficient to provide 1 part of the antioxidant per 100 parts of monomer. Each terminated mixture was then coagulated in isopropyl alcohol and the polymer separated and dried under vacuum at 60° C. The results obtained in these runs are shown below in Table III.

TABLE III

| Run No. | Initiator Type | Mhm.[a] | Conv., percent | Inherent viscosity[b] | Unsaturation Cis-1,4, percent | 3,4 percent |
|---|---|---|---|---|---|---|
| 1 | X[c] | 5.0 | 98 | 2.57 | 76 | 6.8 |
| 2 | X[c] | 3.0 | 100 | | | |
| 3 | X[c] | 2.0 | 100 | 5.22 | 86 | 5.8 |
| 4 | X[c] | 1.8 | 100 | 6.19 | 85 | 5.7 |
| 5 | X[c] | 1.5 | 0 | | | |
| 6 | Y[d] | 3.0 | 0 | | | |
| 7 | Z[e] | 3.0 | 100 | | | |
| 8 | Z[e] | 2.0 | 100 | 4.53 | 77 | 6.6 |
| 9 | Z[e] | 1.6 | 100 | 5.95 | 81 | 6.0 |
| 10 | Z[e] | 1.4 | 100 | 6.95 | 85 | 5.8 |

[a] Gram millimoles per 100 grams of monomer.
[b] All polymers were gel-free.
[c] Alkalinity 0.15 N, ball milled.
[d] Alkalinity 0.13 N, not ball milled.
[e] Alkalinity 0.157 N, mixture Y after ball milling.

The foregoing demonstrates production of a much more active 4-halophenyllithium initiator following subjection of the compound to an abrasive work force and further demonstrates treatment of a relatively inactive initiator already prepared to give a highly active polymerization initiation.

EXAMPLE IV

A 4-halophenyllithium initiator was prepared according to the following recipe and the charge order of Example I.

| | | |
|---|---|---|
| Toluene | ml | 100 |
| 1,4-dibromobenzene | mmoles | 20 |
| n-Butyllithium | do | 20 |
| Time hours | | 2.5 |
| Temperature °C | | 122 |

One run, designated X, was prepared in an ultrasonic bath such as would supply ultrasonic energy to the as-formed initiator. A second run was not prepared in the ultrasonic bath and represents the control and is designated Y. A third run was not prepared in the ultrasonic bath but was subsequently treated in an ultrasonic bath at room temperature for 2 hours and is designated Z. Runs X and Y, based on alkalinity titration of the reaction mixture showed a 96 and 94 percent conversion to 4-bromophenyllthium, respectively. A Model G-140 ultrasonic bath made by Natural Ultrasonic Corporation was used for these examples and operated at 25 kc./s. and at an intensity of .38 w./cm.[2]. These initiators were then employed in the polymerization of isoprene according to the following formula:

| | | |
|---|---|---|
| Cyclohexane | parts by wt | 1000 |
| Isoprene | do | 100 |
| Initiator | do | Variable |
| Time hours | | 1.5 |
| Temperature °F | | 158 |

The charge order, termination and polymer isolation procedures of Example I were followed. The results are reported in Table IV.

TABLE IV

| Run No. | Initiator Run No. | Mhm. | Conv., percent | Inherent viscosity | Unsaturation Cis-1,4, percent | 3,4 percent |
|---|---|---|---|---|---|---|
| 1 | Y[a] | 5.0 | 0 | | | |
| 2 | Y[a] | 3.0 | 0 | | | |
| 3 | X[b] | 5.0 | 95 | 4.01 | 89 | 6.0 |
| 4 | X[b] | 3.0 | 95 | 5.81 | 93 | 5.8 |
| 5 | X[b] | 2.5 | 95 | 6.18 | 93 | 5.8 |
| 6 | Z[c] | 5.0 | 94 | 3.64 | 91 | 6.3 |
| 7 | Z | 3.0 | 84 | 6.15 | 97 | 5.6 |

[a] Control.
[b] Prepared in ultrasonic bath.
[c] Control (Run Y) treated in ultrasonic bath at room temperature for 2 hours.

The foregoing example effectively demonstrates that ultrasonic energy employed in the preparation of 4-halophenyllithium initiators or in the treatment of an initiator already prepared produced a much more active polymerization initiator than the control prepared in the absence of said ultrasonic energy.

EXAMPLE V

A sample of polyisoprene which was prepared employing an initiator which had been ball milled according to this invention was compounded and properties determined. The initiator was prepared according to the recipe shown below.

Initiator recipe

| | | |
|---|---|---|
| 1,4-dibromobenzene | g | [1] 18.9 |
| Cyclohexane | ml | 200 |
| n-Butyllithium | mmoles | 80 |
| Time | hours | 24 |
| Temperature | °C | 50 |

[1] 80 mmoles.

The charging procedure was the same as that employed in Example III. At the end of the reaction period the reaction mixture was ball milled for 4 hours as described in Example III. The mixture was then analyzed by alkalinity titration and gas chromatography as described in Example III. This initiator was then employed for isoprene polymerization according to the recipe shown.

Polymerization recipe

| | | |
|---|---|---|
| Isoprene | parts | 100 |
| Cyclohexane | do | 1000 |
| 4-bromophenyllithium | mhm | 2.0 |
| Time hours | | 3 |
| Temperature °C | | 70 |

The charging, termination, and polymer isolation procedures were the same as those employed in Example III. The polymer was obtained in 99% conversion and was evaluated in a tread stock recipe with a polyisoprene polymer prepared as in U.S. Pat. 3,215,679 using the 3-bromophenyllithium initiator as a control. The compounding recipe is shown below.

Compounding recipe

| | Parts |
|---|---|
| Polymer | 100 |
| IRB #2 [a] | 50 |
| Zinc oxide | 3 |
| Stearic acid | 3 |
| Flexamine [b] | 1 |
| Flexzone 3C [c] | 2 |
| Philrich 5 [d] | 5 |
| Vultrol [e] | 1 |

|  | Parts |
|---|---|
| Sulfur | 2.25 |
| NOBS special [f] | 0.65 |

[a] High abrasion furnace type carbon black.
[b] Mixture containing 65% of a complex diarylamine-ketone reaction product and 35% of N,N′-diphenyl-p-phenylenediamine.
[c] N-isopropyl-N′-phenyl-p-phenylene-diamine.
[d] Highly aromatic oil.
[e] N-nitrosodiphenylamine.
[f] N-oxydiethylene-2-benzothiazolesulfenamide.

The results obtained in this evaluation are shown in Table V.

TABLE V

|  | M | R |
|---|---|---|
| Polymer | Polyisoprene | Polyisoprene. |
| Initiator type | 4-bromo-phenyllithium.[1] | 3-bromo-phenyllithium. |
| Cis-content, percent | 91 | 90. |
| Inherent viscosity | 6.67 | 4.90. |
| Raw Mooney (ML-4 at 212F) [2] | 77 | 57. |
| Physical properties (cured 30 min. at 293° F.) | | |
| Compression set, percent [a] | 16 | 17. |
| 300% modulus, p.s.i.[b] | 1,460 | 1,310. |
| Tensile, p.s.i.[b] | 3,770 | 3,730. |
| Elongation, percent [b] | 600 | 640. |
| Max. tensile at 200° F., p.s.i. | 2,010 | 1,960. |
| ΔT, ° F.[c] | 43 | 46. |
| Resilience, percent [d] | 75 | 71. |
| Shore A hardness [e] | 62 | 60. |

[1] Ball milled.
[2] ASTM D-1646-63.
[a] ASTM D 1646-61.
[b] ASTM D 1646-62T.
[c] ASTM D 1646-62.
[d] ASTM D 1646-59.
[e] ASTM D 1706-61.

The results presented in the foregoing example demonstrate that the ball milled 4-halophenyllithium initiators produce a cis polyisoprene with equivalent or better properties than the more expensive 3-halophenyllithium initiators.

As will be evident to those skilled in the art, various modifications of this invention can be made or followed, in light of the disclosure and the discussion herein set forth, without departing from the scope or spirit thereof.

What is claimed is:

1. A process for preparing 4-halophenyllithium polymerization initiator, which comprises milling 4-halophenyllithium compound as a highly dispersed form in a liquid aliphatic, cycloaliphatic, or aromatic hydrocarbon dispersing medium under an inert atmosphere whereby said milling imparts an abrasive force to said 4-halophenyllithium compound, said 4-halophenyllithium compound is 4-fluorophenyllithium, 4-chlorophenyllithium, or 4-bromophenyllithium, said milling is conducted at a temperature below the melting point of said 4-halophenyllithium compound for a time sufficient to substantially improve the activity of said 4-halophenyllithium compound as a polymerization initiator.

2. The process according to claim 1 wherein said milling temperature is in the range of about −50° C. to 200° C., and said milling time is from about 1 minute to about 100 hours.

3. The process of claim 2 wherein said hydrocarbon medium is a material boiling above about 200° C.

4. The process of claim 2 wherein said milling is ball milling.

5. The process of claim 2 wherein said milling is the process of employing ultrasonic energy wherein the ultrasonic vibration frequency thereof is at least 20 to 1000 kc./sec. and the intensity of said ultrasonic energy is about $10^{-4}$ to 20 w./cm.$^2$.

6. The process of claim 2 wherein said 4-halophenyllithium compound is the direct precipitation product of the reaction of a 1,4-dihalobenzene with lithium metal, sec-alkyllithium, or n-alkyllithium, in a hydrocarbon or polar medium under an inert atmosphere and in the substantial absence of deleterious substances, and where said polar medium is employed, said polar medium is substantially removed prior to said milling.

7. The process of claim 6 wherein said 4-halophenyllithium compound is 4-bromophenyllithium.

8. The improved 4-halophenyllithium polymerization initiator produced according to the process of claim 1.

References Cited

UNITED STATES PATENTS

| 2,947,793 | 8/1960 | Eberly | 260—665 R |
| 2,968,652 | 1/1961 | Mertes | 260—93.7 |
| 3,068,181 | 12/1962 | Schaeffer | 252—430 |
| 3,215,679 | 11/1965 | Trepka | 252—431 R |
| 3,393,189 | 7/1968 | Trepka et al. | 252—431 R |

FOREIGN PATENTS

| 836,702 | 6/1960 | Great Britain | 252—431 |

PATRICK P. GARVIN, Primary Examiner

U.S. Cl. X.R.

260—665 R, 94.2 M, 93.5 R, 88.3 R